Feb. 17, 1959  E. KORTCHMAR  2,873,941
PRESSURE RELIEF VALVE FOR FLUID PRESSURE SYSTEMS
Filed March 21, 1957
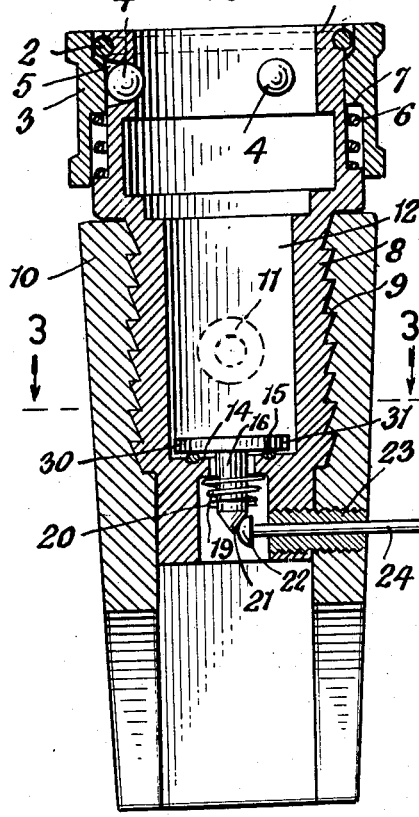
INVENTOR.
Emil Kortchmar
BY
Attorney

United States Patent Office 2,873,941
Patented Feb. 17, 1959

2,873,941

PRESSURE RELIEF VALVE FOR FLUID PRESSURE SYSTEMS

Emil Kortchmar, Larchmont, N. Y.

Application March 21, 1957, Serial No. 647,718

2 Claims. (Cl. 251—148)

This invention relates to relief valves useful for various purposes and in the present embodiment employed in connectors or couplers for use for the connection of portable dish-washing machines, laundry apparatus and other devices to a source of fluid such as water supply from a faucet, tap or other source, or gas. In the use of the devices of this character and in many other fluid-passing devices, it is found that back pressure will build up in the piping and connector so that when the connector is detached from the tap or faucet, the water will spurt or be ejected with force and will deluge surrounding areas as well as the person engaged in removing the connector.

It is therefore one of the objects of the invention to provide a relief valve for use in a connection device of this character in which the bleeder or relief valve will be provided as a part of the connector, thereby permitting the relief of pressure and the removal of water in the device before the connector is removed from the faucet or tap.

It is an object of the invention to provide a connection device which shall be of simple construction; which will be provided with a snap-on connection by means of which it is readily attached to the faucet or tap; which will have means by which it is readily connected to the inlet hose or piping leading to the appliance and with means by which an outlet tube may also be connected to the device.

More particularly, the invention contemplates the provision of a body member having coupling means at one end by means of which it is detachably connected to a faucet or tap; which body is provided adjacent to its other end with a relief valve that is normally held in seated or closed position by a spring and the water pressure, and which is opened by a push button extending through the wall of the body member and operative to tilt the valve from its seat and thus open it to permit of the release of water under pressure; with an inlet opening located between the relief valve and the coupling, and with an outlet located beyond the relief valve.

It is another object of the invention to provide a relief valve for use in fluid pressure systems, the valve being in the form of a disk arranged when closed, to seat against a compressible sealing surface, which valve is adapted to be angularly displaced from sealing position and when so displaced to have its fulcrum of angular tilt on a metallic surface surrounding the compressible sealing surface.

With these and other objects to be hereinafter set forth in view, I have devised the arrangement of parts to be described and more particularly pointed out in the claims appended hereto.

In the accompanying drawing, wherein an illustrative embodiment of the invention is disclosed, Fig. 1 is a vertical sectional view through a connection device or coupler constructed according to the invention;

Fig. 2 is a side elevational view of the connection device, taken at right angles to the view of Fig. 1;

Fig. 3 is a sectional view taken substantially on the line 3—3 of Fig. 1, looking in the direction of the arrows; and Fig. 4 is a diagrammatic view showing the relief valve or bleeder and disclosing the manner in which the same is tilted to open position by operation of a push button.

Referring to the drawing, 1 is a body member which is preferably made of non-corrosive metal and is provided with a central passage or bore 12. Adjacent to its upper end, the body member 1 is provided in its wall with a plurality of tapered apertures 5, three of which are preferably employed, and in each aperture is located a movable ball 4. Surrounding this portion of the body member 1 is an axially movable annulus or ring member 3, which is normally held in an elevated or raised position, as shown in Figs. 1 and 2, by means of a coil spring 6 surrounding part of the body member 1 and maintained between a shoulder formed thereon and a shoulder 7 formed on the ring 3. The ring 3 is maintained from displacement from the upper end of the body member 1 by means of a wire retaining-ring 2 fitted in a groove formed in the body member adjacent to its upper end.

The above-described arrangement is employed as a snap-on connection by means of which the connector can be quickly attached to or removed from a faucet or tap or to other source of supply of a fluid or gas. When the ring 3 is manually drawn downwardly against the pressure of spring 6, the balls 4 will be free to move outwardly or radially and thus permit the end of the faucet or tap to enter into the mouth portion of the bore 12. Upon release of manual pressure on the ring 3, the spring 6 will raise or elevate the ring 3, causing the balls 4 to be forced inwardly by the ring and caused to grippingly engage the threaded end of the faucet or tap, thereby attaching the connector to the tap. Release of the connector from the faucet or tap is obtained by drawing down the ring and thus allowing the balls to move outwardly and release their frictional grip on the faucet, whereupon the connector may be detached.

The lower portion or shank 8 of the body member 1 is serrated, toothed or otherwise roughened to engage in a housing member 10, which may be made of metal or plastic material and can be cylindrical or rectangular in cross-sectional shape as shown in the drawing. Near the lower end of the body member 1 and within the shank portion 8 thereof, is provided a shoulder 14 constituting a valve seat for a relief valve or bleeder generally indicated at 30. Said valve 30 has a disk 31 which normally seats upon a ring-shaped insert 15, which may be of round cross-sectional shape and of rubber or other suitable compressible material, affording a watertight seal. The valve 30 is provided with the disk-shaped head 31 (Fig. 4) from which projects a dependent and possibly integral stem 16 terminating in the tapered end 21. A coil spring 19 surrounds the stem 16 and is disposed between a pin 20 extending through the stem 16, and the under side of the shoulder 14, the spring being thus effective to normally hold the valve disk 31 on the seat 14 and in contact with the sealing ring 15 substantially as shown in Fig. 4. As an alternative, a spring might be employed above the upper end of the disk 31 to thereby hold the same in its seated position.

Extending through one of the walls of the housing member 10 is a bushing 23, said bushing also continuing through the lower end portion of the body member 1 to lead into the bore therein, and said bushing serves as a guide for a push button slidably mounted within said bushing 23. Said push button consists of a stem 24 having a rounded head 22 at its inner end, said head being disposed against the tapered end or terminal 21 of the stem 16. At its outer end the stem 24 is provided with a button of finger-piece 25 for manual engagement to force the push button inwardly and cause tilting or raising movement of the valve disk 31 from its seat, substantially as shown in dotted lines in Fig. 4.

Extending through the housing member 10 as well as through the body member 1 to communicate with the bore 12 therethrough, is a nipple 11 to which a hose or flexible tube 13 constituting a water feed or delivery tube to the washing machine or other appliance. It will be noted that this nipple enters into the bore 12 at a point between the upper end or mouth of the body member 1 whereat the faucet or tap is attached, and the valve 30. The lower portion of the housing member 10 is provided in one of its walls 26, at a point below the lower end of the body member 1, with a threaded aperture 27 which can receive a nipple or other connection device to which the outlet or drain hose 28 from the washing machine or other appliance is connected.

From the foregoing, the structure and operation of the described connection device will be clear. The device is coupled to a faucet or tap by the snap-on connection as previously described, and when the water is caused to flow into the connector, it will be forced into bore 12 and cut through nipple 11 and through the hose 13 to the washing machine or other appliance. While the water is thus flowing, the valve 30 will have its disk 31 retained on the seat 14 and against the sealing ring 15 thereon aided by the spring 19 by the pressure of the water against the disk. Water drained out from the appliance will pass through the hose 28 to enter into the lower portion of the housing member 10 and will flow down through the open lower end of this member into a sink or basin over the faucet to which the connector is attached.

When it is desired to remove the connector from its attachment to the faucet, pressure is first relieved by opening the valve 30 by operation of the push button. This is done by imposing finger pressure on the button 25 to thereby move the stem 24 inwardly to cause its rounded head 22 to exert pressure on the tapered end 21 of the valve stem 16. The effect of such pressure on the tapered end of the valve stem is to cause the valve to be tilted or tipped on its seat, substantially as shown in dotted lines in Fig. 4, to thereby hold the valve open and allow the escape of fluid under pressure and thereby release the excess pressure. Upon release of finger pressure on the button 25, the spring 19 will cause reseating or closing of the valve 30. Since the fluid pressure has now been relieved, the connector may be detached from the faucet or tap without causing spurting of the water. When the valve is tilted or angularly unseated as above described, the fulcrum of the angular movement of the disk 31 is located at the point 32 in Fig. 4, or against the hard metallic surface of the shoulder 14, rather than against the soft compressible sealing ring 15, thus avoiding wear on the ring.

Accordingly, the seat 14 extends beyond the sealing ring 15, thus providing an annular area of hard metallic material against which the disk 31 will contact when it is tilted as above described.

It will be apparent that the device may be made in various forms, and particularly in relation to the surrounding housing body, that shown being merely illustrative.

It will be also clear that while the relief valve shown is embodied in a connection device of a specific form, it can be used in other environments or in other localities in fluid pressure systems.

Having described a single embodiment of the invention, it is obvious that the same is not to be restricted thereto, but is broad enough to cover all structures coming within the scope of the annexed claims.

What I claim is:

1. A relief valve having a seat provided with a soft sealing material of round cross sectional shape surrounded by a harder surface, the valve including a disk seating against the soft material when in closed position and capable of angular displacement, the disk when so displaced contacting the harder surface to provide fulcrum of angular movement to cause rocking of the disk against the harder surface of the seat.

2. A relief valve for fluid pressure systems comprising, a housing having an inlet and an outlet, a pressure relief valve having a disk-shaped head, a valve seat of greater diameter than the head, said seat including a soft sealing ring of circular cross-sectional shape mounted in the seat and presenting a raised convex surface above the surface of the seat, said ring being of less diameter than the seat to thereby provide an annular seating surface on the seat between the periphery of the ring and the outer limits of the seat, spring means for holding the disk in contact with the sealing ring, the seat having a central opening, the disk having a centrally positioned stem extending through the opening, a push-rod slidable through a wall of the housing and having an end contacting with the stem whereby a push imposed on the outer end of the push-rod causes tilting of the disk on the convex surface of the sealing ring and causes the disk to rest against the harder annular surface of the seat beyond the sealing ring.

References Cited in the file of this patent

UNITED STATES PATENTS

| | | |
|---|---|---|
| 905,818 | Langford | Dec. 1, 1908 |
| 1,083,467 | Sloan | Jan. 6, 1914 |
| 1,416,317 | Banta | May 16, 1922 |
| 1,439,763 | Schaffer | Dec. 26, 1922 |
| 1,505,492 | Reddig | Aug. 19, 1924 |
| 1,556,442 | Holcomb | Oct. 6, 1925 |
| 1,950,172 | Gavaza | Mar. 6, 1934 |
| 2,007,652 | Kocour | July 9, 1935 |
| 2,023,788 | Miller | Dec. 10, 1935 |
| 2,136,221 | Sloan | Nov. 8, 1938 |
| 2,212,607 | Langdon | Aug. 27, 1940 |
| 2,452,256 | Muller | Oct. 26, 1948 |
| 2,524,951 | Ashton | Oct. 10, 1950 |
| 2,598,417 | Niemann | May 27, 1952 |